(12) United States Patent
Adamski et al.

(10) Patent No.: US 11,059,525 B2
(45) Date of Patent: Jul. 13, 2021

(54) BEAM HAVING AT LEAST ONE HOLLOW CHAMBER

(71) Applicant: BENTELER AUTOMOBIL TECHNIK GMBH, Paderborn (DE)

(72) Inventors: Lucas Adamski, Paderborn (DE); Andreas Hitz, Erwitte (DE); Alex Mirau, Hoevelhof (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 68 days.

(21) Appl. No.: 16/683,442

(22) Filed: Nov. 14, 2019

(65) Prior Publication Data

US 2020/0164928 A1 May 28, 2020

(30) Foreign Application Priority Data

Nov. 22, 2018 (DE) ...................... 10 2018 129 396.8

(51) Int. Cl.
*B60J 7/00* (2006.01)
*B62D 29/00* (2006.01)

(52) U.S. Cl.
CPC .................................. *B62D 29/008* (2013.01)

(58) Field of Classification Search
CPC .......... B60G 2204/1434; B60G 21/051; B60G 21/052; B60G 2206/20; B60G 2200/20; B60G 2200/31; B60G 7/02; B60G 9/00
See application file for complete search history.

(56) References Cited

U.S. PATENT DOCUMENTS

| | | | | |
|---|---|---|---|---|
| 6,331,092 B1 * | 12/2001 | Linger | .................... | E04B 2/761 403/367 |
| 7,213,376 B2 * | 5/2007 | Pulkkanen | ............ | E04B 1/4121 52/283 |
| 8,002,507 B2 * | 8/2011 | James | ................ | B64D 11/0696 411/85 |
| 8,656,669 B2 * | 2/2014 | Schneider | ............. | B29C 44/128 52/232 |
| 8,973,316 B2 * | 3/2015 | Safford | .................... | E04B 2/885 52/204.62 |
| 9,200,691 B2 * | 12/2015 | Boes | ........................ | F16F 7/108 |
| 2001/0004099 A1 * | 6/2001 | Onishi | .................. | F16B 37/045 248/49 |
| 2011/0272870 A1 * | 11/2011 | Akagawa | ................ | F16F 1/373 267/141 |

FOREIGN PATENT DOCUMENTS

| | | |
|---|---|---|
| DE | 102013114789 | 6/2015 |
| DE | 102015113102 | 2/2017 |

* cited by examiner

*Primary Examiner* — Kiran B Patel
(74) *Attorney, Agent, or Firm* — Sheridan Ross P.C.

(57) ABSTRACT

The invention relates to a beam having at least one hollow chamber for receiving a bolt element in a bush of the beam. The beam is distinguished by the fact that the bush is of multipart design and at least one of these plurality of parts of the bush is cold-joined to the beam.

20 Claims, 6 Drawing Sheets

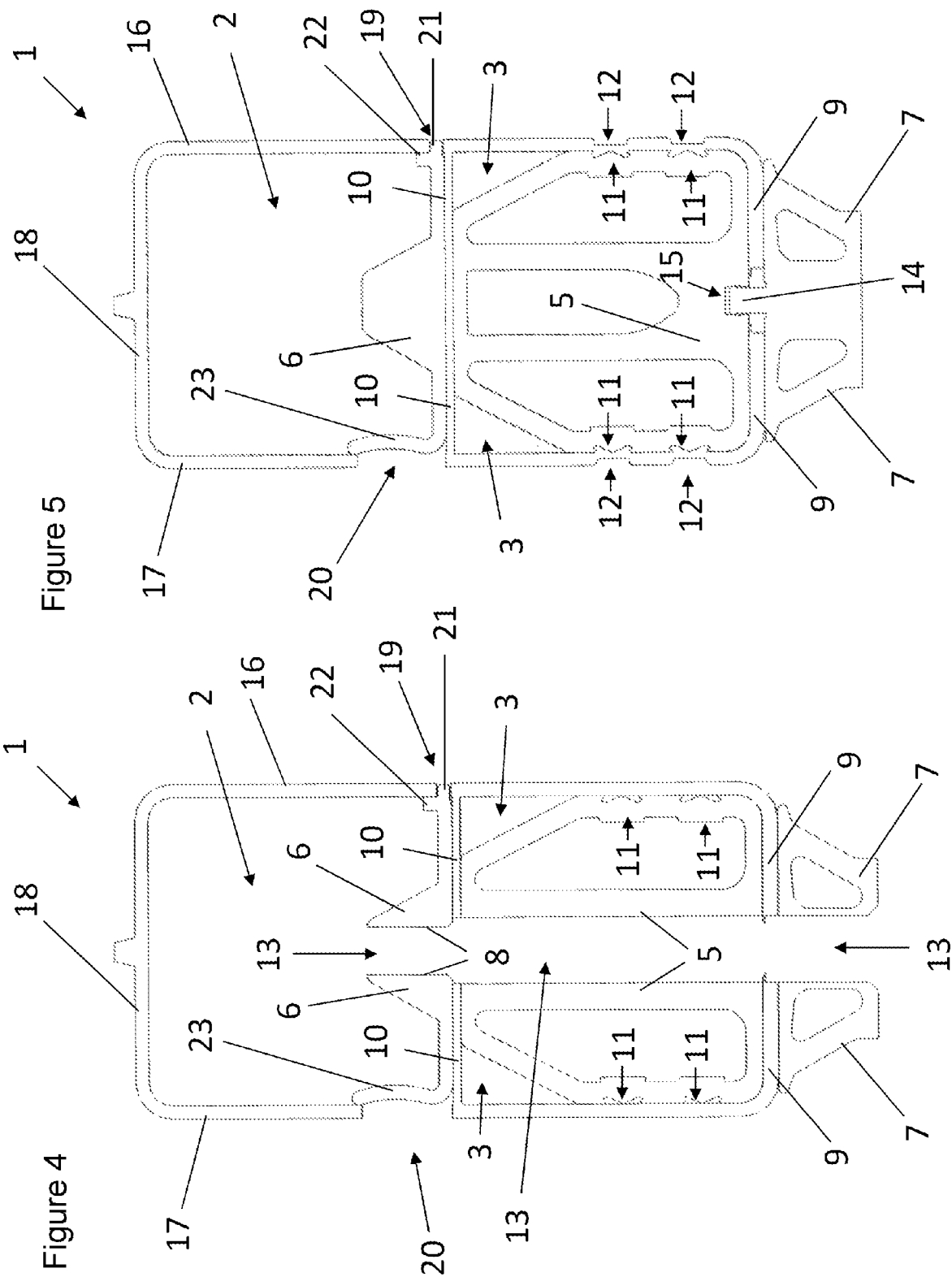

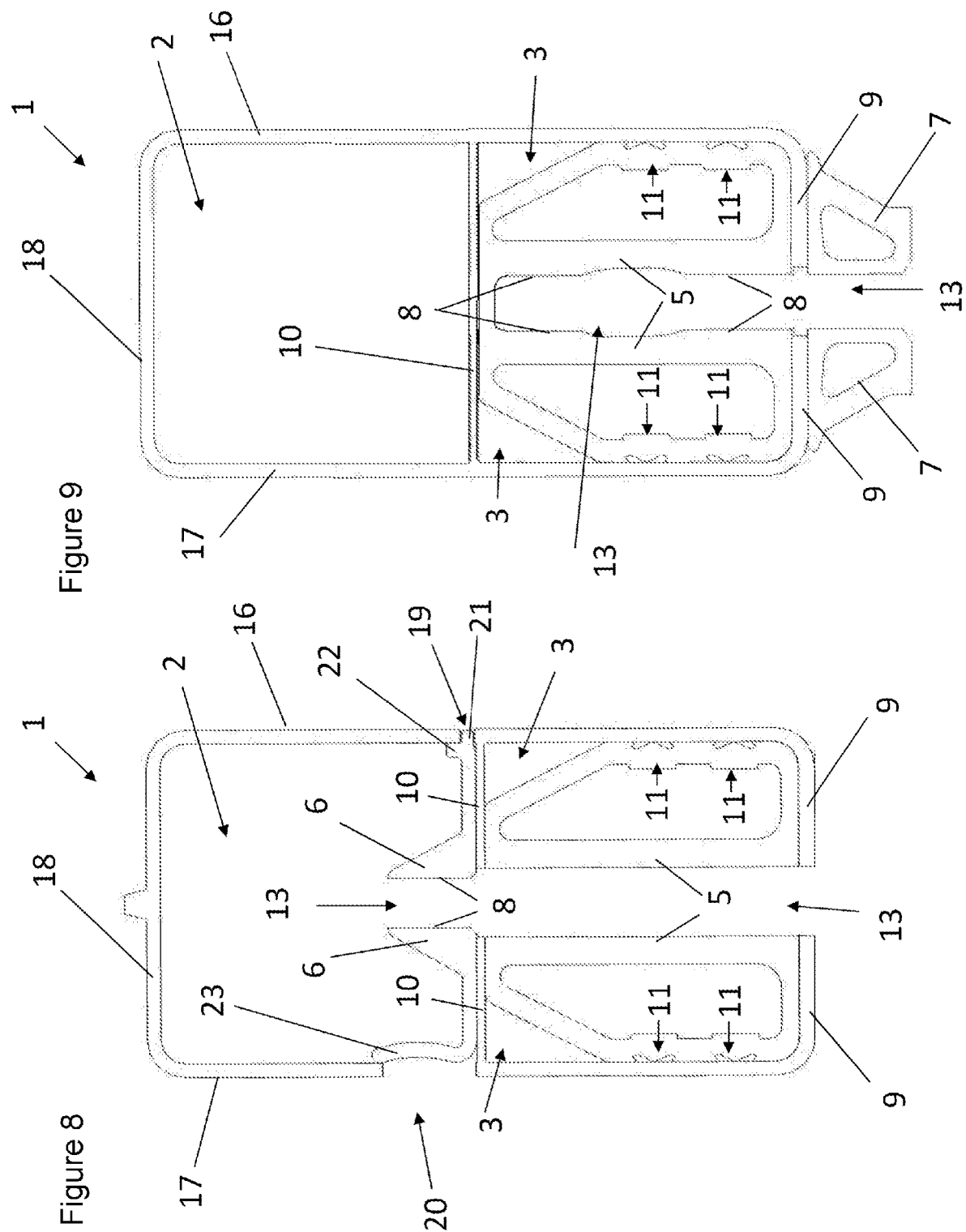

BEAM HAVING AT LEAST ONE HOLLOW CHAMBER

CROSS-REFERENCE TO RELATED APPLICATION

This application claims the benefit of German Patent Application No. DE 10 2018 129 396.8 filed Nov. 22, 2018, the entire contents of which are incorporated herein by reference.

FIELD

The invention relates to a beam having at least one hollow chamber for receiving a bolt element in a bush of the beam, wherein the bush is of multipart design and at least one of these plurality of parts of the bush is cold-joined to the beam.

BACKGROUND

Such beams are used in a wide variety of ways in the automotive sector. It is particularly the case according to the prior art that an engine of the motor vehicle is bolted via a bush in such a beam, which takes the form of a longitudinal beam, of the front section of the motor vehicle. Here, use is made of left and right corresponding beams in the motor vehicle. This component design serves for fastening the engine to the body. Such a beam taking the form of a longitudinal beam is also referred to as an engine bearer and consists of a longitudinal beam profile which is formed for example as an extruded aluminum single-chamber or multi-chamber profile and is provided with a bush which serves to fasten the engine via a bolt, a bolt element, a screw or the like. This bush is connected in an integrally bonded manner by welding to the longitudinal beam in the chamber profile head and foot region. Here, the bush itself is of one-part design. The bush is here plugged through corresponding openings into one or more hollow chambers of the single-chamber or multi-chamber profile. The bush serves here for stiffening the bolt/longitudinal beam connection, with it of course also being possible for the bolt to take the form of a screw. By virtue of the integrally bonded connection between the bush and the hollow chamber of the beam, there occur distortions and the softening of the joining point as a result of the thermal influence during the production of the integrally bonded connection by welding in this region. In particular, the softening of the joining point reduces the possible load changes. This can be compensated for by a corresponding material accumulation, which has a disadvantageous impact on the component weight. Corresponding beams are known from DE 10 2013 114 789A1 and DE 10 2012 022 876A1, for example.

SUMMARY

It is therefore the object of the invention to develop a beam in such a way that such a beam a secure fastening of the engine to the vehicle frame or the body of a motor vehicle is ensured, with it being intended to avoid the problem of distortion and softening of the joining point between the hollow chamber of the beam and bush. In addition, it is intended to achieve optimization of the component weight of the beam.

Here, the beam according to the invention has at least one hollow chamber for receiving a bolt element in a bush of the beam and is distinguished according to the invention by the fact that the bush is of multipart design and at least one of these plurality of parts of the bush is cold-joined to the beam. The configuration according to the invention of the beam and of the bush joined thereto now makes it possible to provide a secure connection between the bush and the at least one hollow chamber of the beam without having to resort to thermal joining methods, such as, for example, welding. This ensures that the joining region between the bush and the hollow chamber of the beam experiences no distortion nor any softening during joining, and therefore no measures have to be taken which again compensate for such phenomena. In particular, it is thereby possible to dispense with a material accumulation in the joining region, with the result that a reduction in the component weight can also be achieved.

There can be provision here that at least one part of the bush can be inserted into one of the at least one hollow chamber of the beam, with a plug-through opening within this part of the bush being positioned with respect to a corresponding plug-through opening for the bolt within the hollow chamber such that the bolt can be guided therethrough.

Here, at least the part of the bush that is situated opposite the plug-in opening of the bolt within the hollow chamber of the beam can advantageously have an internal thread which corresponds to an external thread of the bolt. It is therefore advantageous that at least one part of the bush has an internal thread which corresponds to an external thread of the bolt, with, more advantageously, the part of the bush having the internal thread which is situated opposite to the part of the bush through which the bolt is first guided.

According to a further advantageous embodiment of the invention, there is provision that at least one part of the bush is cold-joined to the at least one hollow chamber, with a further part of the bush being clamped in between walls of the hollow profile. It is possible here that in each case a wall of the at least one hollow chamber is arranged between the individual parts of the bush. When joining the bolt or bolt element to the bush, individual parts of the latter and walls of the hollow chamber which are situated between them are clamped in and thus also a durable and dynamically loadable fixing of the bolt element to the beam is ensured. A further advantage of this embodiment of the invention is that a high dimensional accuracy of the connection of bush and beam can be achieved, with a tolerance compensation automatically occurring between the longitudinal beam and bush by means of the configuration according to the invention when the bolt element is joined, in particular bolted, to the bush. It is advantageous here if at least two parts of the bush are captively arranged in the beam before the bolt element is connected to the bush.

According to another concept of the invention, there is now provision that the at least one part of the bush that is cold-joined to the hollow chamber has elements which, after the cold-joining operation, interact with elements or walls of the at least one hollow chamber in such a way that, in the region of these elements, the part of the bush forms a form fit with the at least one hollow chamber or with a wall of the hollow chamber. This configuration of the invention ensures that this part of the bush can be securely and exactly positioned in the at least one hollow chamber of the beam, with the result that the bolt element or the bolt can be guided without problems through a plug-in opening of this part of the bush, since the exact positioning is fixed by the form fit of the elements of the bush and of the hollow chamber. There can be provision here that a corresponding end stop is provided when inserting the part of the bush into the at least one hollow chamber of the beam, in which the bush is exactly positioned with its plug-through opening for the bolt or the bolt element, with the result that there is no need when inserting the bolt or the bolt element into the bush for a separate work operation or a separate tool in order to hold the part of the bush in its position. As a result, both the time expenditure and the tool use when producing a connection between the bolt or bolt element and the bush are optimized.

There can be provision that the form fit is formed by undercuts between the elements of the cold-joined part of the bush and the elements of the at least one hollow chamber. Such undercuts are already known in the prior art to ensure a secure positioning of two parts with respect to one another. These undercuts are here obtained simultaneously with the elements of the hollow chamber during cold-joining, for example during a cold-pressing of the at least one hollow chamber with one part of the bush. It is additionally possible for the two parts, namely the part of the bush and the hollow chamber, to be clinched with one another during cold-joining.

Alternatively, it is of course also possible that the form fit is formed by a simple stamping as a cold-joining operation between the one part of the bush and the at least one hollow chamber. Here, too, there can also be provision that the bush is crimped with the hollow chamber during cold-joining and is fixed here in such a way that the through-opening of the part of the bush is positioned corresponding to an opening for guiding through the bolt within the hollow chamber.

Also conceivable of course are further form-fitting connections of the individual elements of the part of the bush and the hollow chamber which ensure secure fixing of the part of the bush by means of a cold-joining operation in its end position.

For example, according to a further concept of the invention, it is namely possible for the at least one part of the bush to be arranged in the at least one hollow chamber in a form-fitting manner. Specifically in this embodiment, the entire part of the bush is supported within the hollow chamber against the latter such that a secure positioning of the part of the bush within this hollow chamber is ensured. Here, too, it is of course possible to provide end stops by means of which the part of the bush is fixed in its end position.

According to a further advantageous embodiment of the invention, there can of course also be provision that at least two of the parts of the bush are cold-joined to one another, in particular cold-pressed with one another. Such a configuration of the invention makes it possible for the thus connected parts of the bush to be positioned with respect to one another in their end position already before the bolt or the bolt element is guided through the bush, with the result that a problem-free guidance of the bolt or the bolt element through the plug-through opening of the individual parts of the bush is ensured.

However, it is also possible to correspondingly position and fix at least a further part of the bush within the beam such that the plug-through openings of the individual parts of the bush are already correspondingly positioned with respect to one another before guiding through the bolt or the bolt element without this part of the bush being joined to another part of the bush beforehand. In particular, individual parts can be inserted into a part or a hollow chamber of the beam and be positioned by clamping or clinching, clipping or the like in such a way that the plug-through openings of the individual parts of the bush for guiding through the bolt or the bolt element are already correspondingly positioned and fixed with respect to one another.

Furthermore, it has proved to be particularly advantageous here if the bush is formed from three parts in a three-part design. Specifically, three parts form a particularly stable bush and can be positioned with respect to one another in a particularly effective manner and can be correspondingly positioned in the hollow chambers of the beam or the beam itself in such a way that the bush or its parts are supported on the beam itself, with the result that energy introduced by a bolt or a bolt element can be transferred into the bush to the beam in a particularly effective manner.

However, it is also possible to achieve a similar energy dissipation if the bush is formed from two parts in a two-part design.

It is particularly advantageous if the beam takes the form of a longitudinal beam for a motor vehicle to which an engine of the motor vehicle can be fastened via at least one bolt element.

Aims, advantages, features and application possibilities of the present invention will emerge from the following description of exemplary embodiments with reference to the drawings. Here, all of the features described and/or graphically represented form on their own, or in any desired meaningful combination, the subject matter of the present invention, irrespective of how they are combined in the claims or how the claims refer back.

BRIEF DESCRIPTION OF THE DRAWINGS

In the drawings:

FIG. 4 shows a sectional illustration of the beam of FIGS. 2 and 3 in the region of the plug-through openings of the bush before a cold-joining operation, FIG. 5 shows a sectional illustration of the beam of FIGS. 2 and 3 through the bush outside its plug-through openings after a cold-joining operation, and FIGS. 6 to 9 show sectional illustrations of four further exemplary embodiments of a beam according to the invention having different bushes.

DETAILED DESCRIPTION

Figure 1:
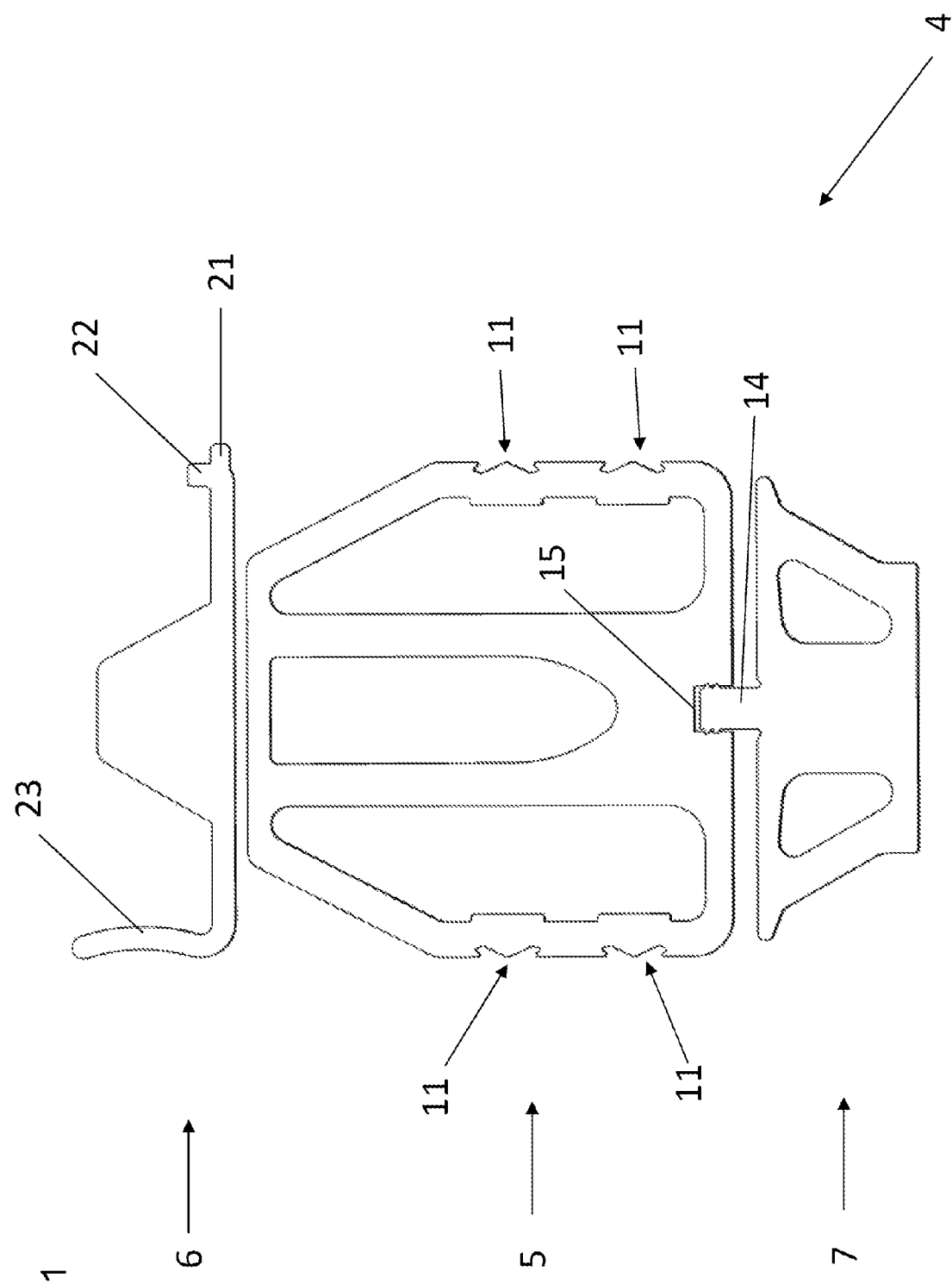
FIG. 1 shows an exemplary embodiment of a bush of a beam according to the invention in a sectional illustration.

FIG. 1 shows an exemplary embodiment of a bush 4 for a beam according to the invention. Here, the bush 4 is of three-part design with parts 5, 6 and 7, with the part 5 forming a central part, the part 6 forming an upper part and the part 7 forming a lower part of the bush 4.

It can already been seen in the illustration of FIG. 1 that the part 7 formed as lower part is pressed together with the part 5 formed as central part via a plug connection. Here, the part 7 has a plug element 14 which is plugged into a plug-in opening 15 of the part 5 and hence the part 5 is cold-joined to the part 7 by the plug element 14 of the part 7 being pressed in the plug-in opening 15 of the part 5. This cold-joining connection ensures a prefixing of the bush in the beam. In this illustration of FIG. 1, the part 6 of the bush formed as upper part is not yet connected to the two other parts 5 and 7 of the bush.

Furthermore, it can also be seen in the illustration of FIG. 1 that the part 6 of the bush 4 formed as upper part has at its one end a plug-in element 21 and a supporting element 22 and at its other end a lever-shaped spring element 23. These elements 21 to 23 serve to correspondingly position and fix the part 6 within a beam.

Correspondingly, the part 5 has elements 11 which make it possible for the part 5 to be likewise correspondingly positioned and fixed within a beam.

Figure 2:
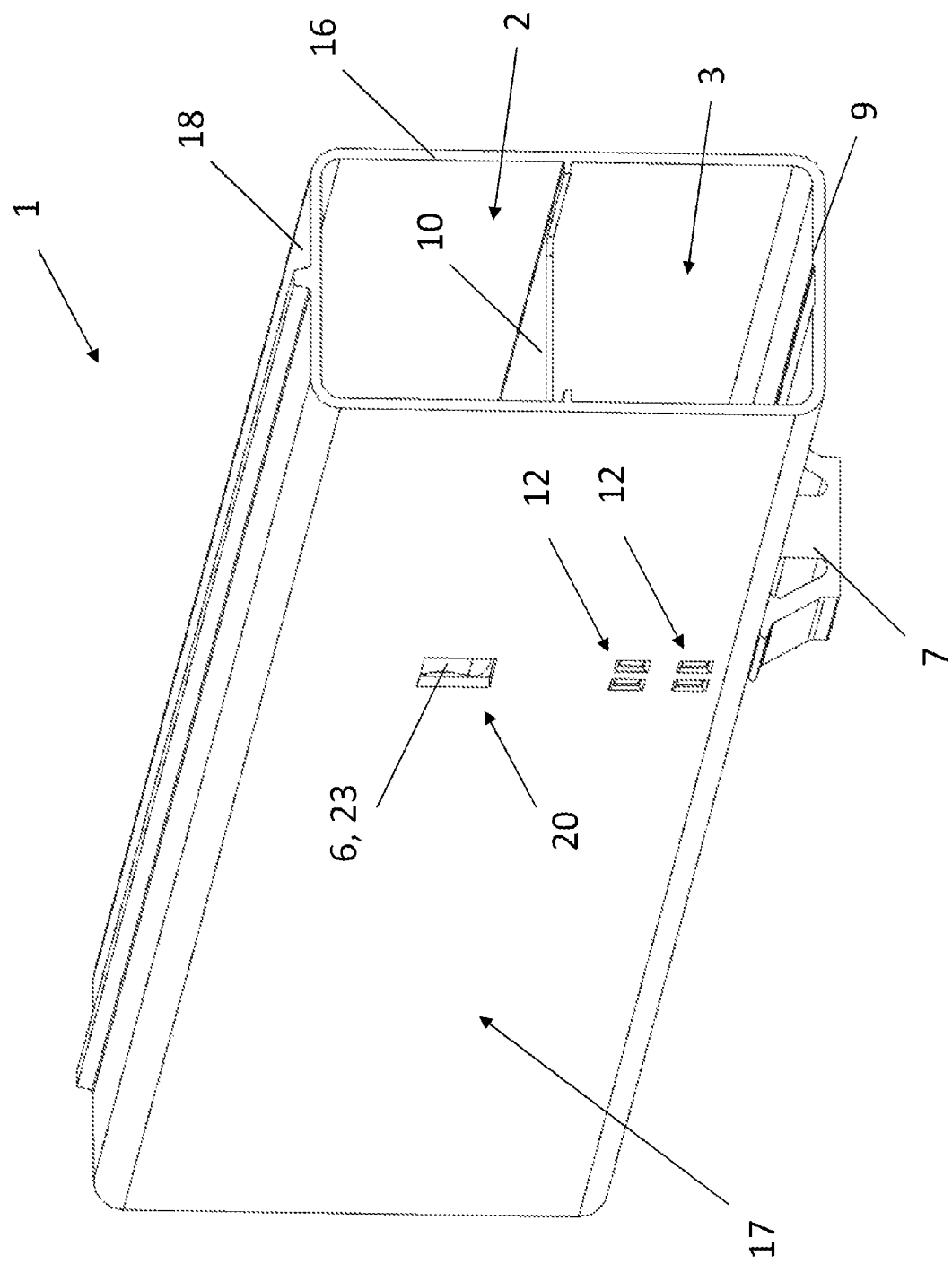
FIG. 2 shows a perspective view of an exemplary embodiment of a beam according to the invention in which the bush according to FIG. 1 is inserted.
Figure 3:
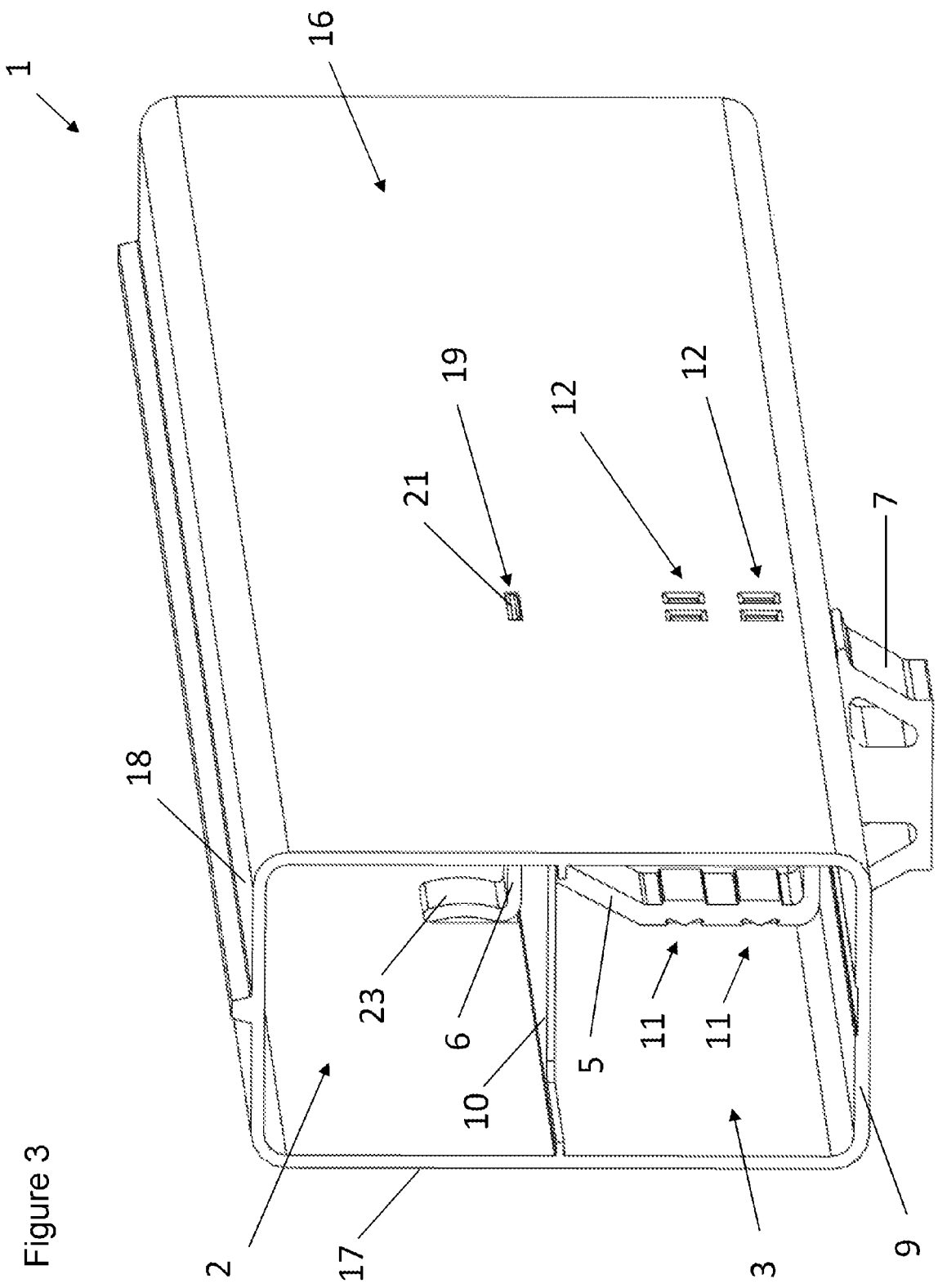
FIG. 3 shows another perspective view of the beam of FIG. 2.

FIGS. 2 and 3 now show one exemplary embodiment of a beam 1 according to the invention in which a bush 4 corresponding to FIG. 1 is arranged by way of its parts 5, 6 and 7 after a cold-joining operation. In both views, a bolt or bolt element by means of which a part, for example an engine or an engine frame, can be fastened to such a beam 1 is not yet guided through the bush 4.

The beam 1 of FIGS. 2 and 3 takes the form of a two-chamber profile with an upper hollow chamber 2 and a lower hollow chamber 3. Here, the two hollow chambers 2 and 3 are separated from one another by a wall 10. Here, the wall 10 interconnects walls 16 and 17, which are formed as side walls. The two walls 16 and 17 are interconnected at their upper and lower end by means of further walls 9 and 18. Now, the part 5 of the bush 4 formed as central part is arranged within the lower hollow chamber 3, whereas the part 6 of the bush 4 formed as upper part is arranged in the upper hollow chamber 2. Here, the elements 11 of the part 5 in the hollow chamber 3 are connected to elements 12 of the hollow chamber 3 or its wall in a form-fitting manner, with the part 5 of the bush 4 also being clinched with the hollow chamber 3 of the beam 1 or its wall by virtue of the form-fitting connection of the elements 11 and 12, with the result that a self-locking of the part 5 within the hollow chamber 3 of the beam 1 occurs.

The part 7 as lower part of the bush 4 is now arranged on the wall 9 formed as outer wall. The parts 5, 6 and 7 are here arranged within or on the beam 1 in such a way that their through-openings (not shown here) are arranged or positioned with respect to one another such that a bolt or a bolt element or screw can be guided through the individual parts 5, 6 and 7 of the bush 4 in a simple manner.

The part 6 of the bush formed as upper part is arranged within the upper hollow chamber 2 of the beam 1 in such a way that it engages by its plug-in element 21 in an opening 19 within the wall 16 of the beam 1 and is supported inside the hollow chamber 2 with the supporting element 22 on the wall 16 of the beam 1. Here, the part 6 can have been introduced laterally into the hollow chamber 2 through the opening 20 or else have been introduced from an end side longitudinally with respect to the beam longitudinal direction.

On the opposite wall 17 of the beam 1 to the wall 16, the part 6 engages by its lever-shaped spring element 23 in an opening 20 of the wall 17, while it is simultaneously supported inside the hollow chamber 2 on the wall 17 of the beam 1. This arrangement results in the part 6 being securely and captively arranged or clamped in the hollow chamber 2 of the beam 1.

FIGS. 4 and 5 now show different sectional illustrations through the beam 1 of FIGS. 2 and 3.

FIG. 4 here shows a sectional illustration in the region of the plug-in openings 13 of the individual parts 5, 6 and 7 of the bush 4 before the part 5 is cold-joined to the hollow chamber 3. It can particularly clearly be seen in this sectional illustration how the part 5 of the bush 4 is arranged in the hollow chamber 3. Here, the elements 11 of the part 5 which enter into a form-fitting connection with the elements 12 of the lower hollow chamber 3 after a cold-joining operation can be clearly seen in their end position. There can also be seen the spaces in the region between the walls 16 and 17 of the hollow chamber 3, in which, after a cold-joining operation, there are formed the elements 12 of the hollow chamber 3 which enter in a form fit with the elements 11 of the part 5 of the bush 4, with the elements 11 and 12 undercutting one another.

FIG. 5 now shows the beam 1 after a cold-joining operation, in particular after a cold-pressing of the part 5 of the bush 4 with the lower hollow chamber 3 in the region of the elements 11 of the part 5 of the bush 4. Here, the elements 11 of the part 5 of the bush 4 mutually form, with the elements 12 of the hollow chamber 3, undercuts for one another such that the part 5 is securely held in the hollow chamber 3 of the beam 1 by a cold-pressing operation or by clinching.

The part 6 of the bush 4 formed as upper part is arranged in the upper hollow chamber 2 of the beam 1 in a similar manner. It can clearly be seen here how the part 6 engages by way of its plug-in element 21 in the opening 19 in the wall 16 of the beam 1 and is here simultaneously supported by its supporting element 22 inside the hollow chamber 2 on the wall 16 thereof. In the opposite wall 17 of the hollow chamber 3 to the wall 16, the spring element 23 is supported inside the hollow chamber 2 by its one end on the wall 17. As a result, the element 6 is securely fixed and positioned in the upper hollow chamber 2 of the beam 1, with the plug-through openings 13 of the parts 5, 6 and 7 of the bush 4 being arranged with respect to one another in such a way that a bolt or a bolt element or a screw can be guided through these plug-in openings 13. In order that the bolt can be fixed within the bush or joined thereto, the part 6 of the bush 4 formed as upper part has in its plug-in opening 13 an internal thread 8 which duly corresponds to an external thread of a bolt or a bolt element or a screw.

The part 7 of the bush 4 formed as lower part is situated outside the beam 1 on its wall 9 and is cold-joined to the part 5, with the plug element 14 of the part 7 engaging in a plug-in opening 15 of the part 5 and thus the part 7 being cold-pressed with or cold-joined to the part 5, the wall 9 of the beam 1 being arranged or clamped in between the parts 5 and 7.

Figure 6:
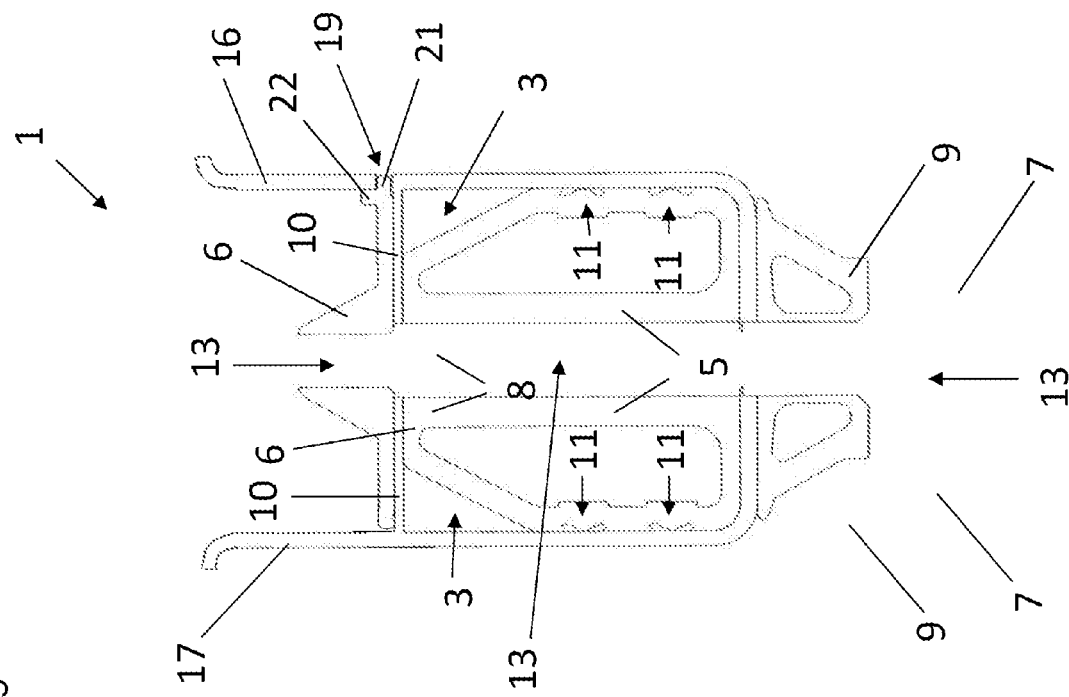

FIG. 6 now shows a further exemplary embodiment of a beam 1 according to the invention. The latter substantially corresponds to the beam 1 shown in FIGS. 2 to 5, with the difference that the elements 11 and 12 of the part 5, which is formed as central part of the bush 4, and of the hollow chamber 3 are now not formed by undercuts but by simple inter-engaging and mutually corresponding stamped formations. Such stamped formations or configurations of the elements 11 and 12 also ensure a self-locking of the part 5 in the hollow chamber 3 that is similar to the elements 11 and 12 shown in FIGS. 2 to 5 which form mutual undercuts.

Figure 7:
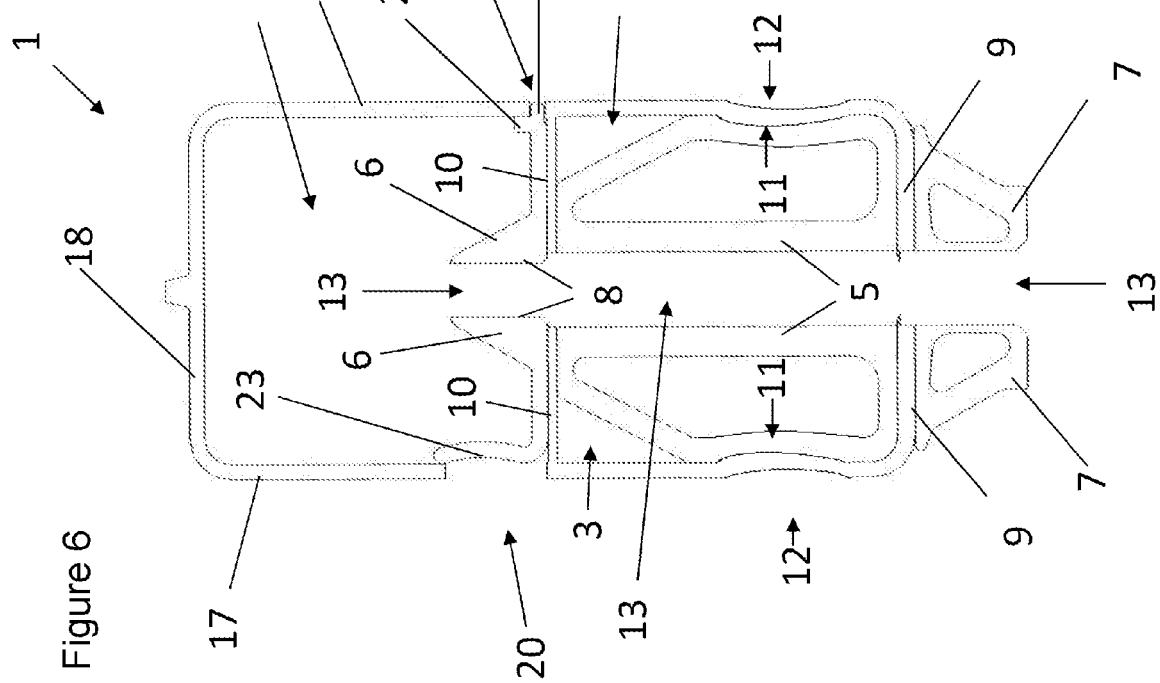

FIG. 7 shows a further exemplary embodiment of a beam 1 according to the invention, with the part 5 of the bush not yet having been cold-joined to the hollow chamber. This beam 1 corresponds substantially to the beam 1 of FIGS. 2 to 5, although the beam 1 here has only one hollow chamber 3 in which the part 5 of the bush 4 is received. In this exemplary embodiment, the part 6 of the bush 4 formed as upper part is not received in a hollow chamber but in an upwardly open beam element. That is to say that the walls 16 and 17 of the beam 1 are not interconnected by a wall at their upper end. Nor, furthermore, does the part 6 now have a lever-shaped spring element which is supported on the wall 17 of the beam. In other respects, the configuration of this exemplary embodiment corresponds in an identical manner to that of the exemplary embodiment of FIGS. 2 to 5.

FIGS. 8 and 9 now show exemplary embodiments in which the bush 4 is not of three-part design but of only two-part design, with the part 5 of the bush not yet having been cold-joined to the hollow chamber.

Here, FIG. 8 shows an exemplary embodiment of a beam 5 in which the bush 4 is formed by two parts 5 and 6 which correspond to the part 5 formed as central part and to the part 6 formed as upper part of FIGS. 2 to 5. In this exemplary embodiment, only the part 7 of the bush 4 formed as lower part corresponding to FIGS. 2 to 5 has been dispensed with. In other respects, the beam 1 of FIG. 8 corresponds in an identical manner to the beam of FIGS. 2 to 5.

In a similar manner, the beam 1 of FIG. 9 is of two-part design. However, by contrast with the beam of FIG. 8, the part 6 of the bush 4 formed as upper part of FIGS. 2 to 5 has been dispensed with here. In other respects, the beam of FIG. 9 corresponds in an identical manner to the beam 1 of FIGS. 2 to 5, although, by contrast thereto, an internal thread 8 is now arranged in the through-opening 13 of the part 5 of the bush 4, into which internal thread there can be inserted or screwed a bolt or a bolt element or a screw having a corresponding external thread.

LIST OF REFERENCE SIGNS

1 Beam
2 Hollow chamber
3 Hollow chamber
4 Bush
5 Part
6 Part
7 Part
8 Internal thread
9 Wall
10 Wall
11 Element
12 Element
13 Plug-through opening
14 Plug element
15 Plug-in opening
16 Wall
17 Wall
18 Wall
19 Opening
20 Opening
21 Plug-in element
22 Supporting element
23 Spring element

What is claimed is:

1. A beam, comprising at least one hollow chamber for receiving a bolt element in a bush of the beam, wherein the bush is of multipart design and at least one of these plurality of parts of the bush is cold-joined to the beam, and wherein the beam takes the form of a longitudinal beam for a motor vehicle to which an engine or engine frame of the motor vehicle can be fastened via at least one bolt element.

2. The beam as claimed in claim 1, wherein at least one part of the bush has an internal thread which corresponds to an external thread of the bolt element.

3. The beam as claimed in claim 1, wherein at least two parts of the bush are captively arranged in the beam before the bolt element is connected to the bush.

4. The beam as claimed in claim 3, wherein the at least one cold-joined part of the bush has elements which interact with elements of the at least one hollow chamber in such a way that, in the region of these elements, the part of the bush forms a form fit with the at least one hollow chamber.

5. The beam as claimed in claim 4, wherein the form fit is formed by undercuts between the elements of the cold-joined part of the bush and the elements of the at least one hollow chamber.

6. The beam as claimed in claim 4, wherein the form fit is formed by stamped formations between the elements of the cold-joined part of the bush and the elements of the at least one hollow chamber.

7. The beam as claimed in claim 1, wherein at least one part of the bush is arranged in the at least one hollow chamber in a form-fitting manner.

8. The beam as claimed in claim 1, wherein at least two of the parts of the bush are cold-joined to one another, in particular cold-pressed with one another.

9. The beam as claimed in claim 1, wherein the bush is of three-part design.

10. The beam as claimed in claim 2, wherein at least two parts of the bush are captively arranged in the beam before the bolt element is connected to the bush.

11. The beam as claimed in claim 2, wherein at least one part of the bush is arranged in the at least one hollow chamber in a form-fitting manner.

12. The beam as claimed in claim 3, wherein at least one part of the bush is arranged in the at least one hollow chamber in a form-fitting manner.

13. The beam as claimed in claim 4, wherein at least one part of the bush is arranged in the at least one hollow chamber in a form-fitting manner.

14. The beam as claimed in claim 5, wherein at least one part of the bush is arranged in the at least one hollow chamber in a form-fitting manner.

15. The beam as claimed in claim 6, wherein at least one part of the bush is arranged in the at least one hollow chamber in a form-fitting manner.

16. The beam as claimed in claim 2, wherein at least two of the parts of the bush are cold-joined to one another, in particular cold-pressed with one another.

17. The beam as claimed in claim 3, wherein at least two of the parts of the bush are cold-joined to one another, in particular cold-pressed with one another.

18. The beam as claimed in claim 4, wherein at least two of the parts of the bush are cold-joined to one another, in particular cold-pressed with one another.

19. The beam as claimed in claim 2, wherein the bush is of three-part design.

20. The beam as claimed in claim 3, wherein the bush is of three-part design.

* * * * *